(12) United States Patent
Komer et al.

(10) Patent No.: US 8,626,360 B2
(45) Date of Patent: Jan. 7, 2014

(54) AVIONICS CONTROL AND DISPLAY UNIT HAVING CURSOR CONTROL MODE OF OPERATION

(75) Inventors: Joseph L. Komer, Shawnee, KS (US); Joseph E. Gepner, Overland Park, KS (US); Ryan K. Hogan, Olathe, KS (US); Ted D. Mabie, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 13/438,613

(22) Filed: Apr. 3, 2012

(65) Prior Publication Data

US 2013/0261851 A1    Oct. 3, 2013

(51) Int. Cl.
*G05D 1/00* (2006.01)
*G06F 3/041* (2006.01)
*G06F 3/033* (2013.01)

(52) U.S. Cl.
USPC ............... 701/3; 340/945; 340/971; 340/973

(58) Field of Classification Search
USPC ............................. 701/3; 340/945, 971, 973
See application file for complete search history.

(56) References Cited

U.S. PATENT DOCUMENTS 8,264,376 B1 * 9/2012 McLoughlin et al. ........ 340/945
2008/0119969 A1 * 5/2008 McCullough et al. ............ 701/3

FOREIGN PATENT DOCUMENTS

WO    WO 02/31795 A2 *   4/2002   ............... G08G 5/00

OTHER PUBLICATIONS

Rockwell Collins unveils touch control flight displays to enable natural, eyes forward operation. Jul. 24, 2011, www.rockwellcollins.com.*
McClellan, MAc, "Rockwell Collins advances touch-screen control", Jul. 27, 2011, www.airventure.org.*
Higdon, David, Touchscreen Mania, the Infinitely Variable 'Digital' Interface, Oct. 2011, Avionics News p. 23, paragraphs 1 and 2.*
MFD/PFD Control Unit, Garmin G900X Pilot's Guide, 2007, p. 154.*
Bombardier Pro Line Fusion®, Rockwell Collins, 2011.
Portions of Garmin G2000 Pilot's Guide, pp. v-x, 1-21, Oct. 2011.
Honeywell, Raytheon Hawker 4000 Avionics, Apr. 2006.

* cited by examiner

*Primary Examiner* — Mary Cheung
*Assistant Examiner* — Brian P Sweeney
(74) *Attorney, Agent, or Firm* — Samuel M. Korte; Mohammad M. Ali

(57) ABSTRACT

An avionics control and display unit (CDU) in an integrated avionics system includes a display unit having a touch screen configured to detect touch input. The CDU is configured to have a first mode of operation or a second mode of operation. When the first mode of operation is selected, the display unit is configured to display control indicia to facilitate the control of one or more functions associated with the avionics system. When the second mode of operation is selected, the display unit is configured to enable a cursor control area to facilitate manipulation of indicia displayed by a display device such as a primary flight display (PFD) or a multifunction display (MFD), and so forth, via touch input to the touch screen over the cursor control area.

20 Claims, 10 Drawing Sheets

AVIONICS CONTROL AND DISPLAY UNIT HAVING CURSOR CONTROL MODE OF OPERATION

BACKGROUND

Aircraft have historically been equipped with a collection of mechanical or electro-mechanical flight instrument gauges that provide a pilot with information about the aircraft's position, orientation, speed, and performance. The gauges commonly provide quite limited breadth of functionality—typically only a single function. For example, the instrument panel of an aircraft employing such gauges might include an attitude indicator that shows the aircraft's orientation relative to the horizon, an altimeter that gives information about the aircraft's height above some reference level (e.g. sea-level) by measuring the local air pressure, an airspeed indicator that shows the aircraft's speed relative to the surrounding air, a heading indicator or magnetic compass that displays the direction the aircraft is pointing relative to north, or a turn and bank indicator that displays the direction of turn and rate of turn of the aircraft.

Integrated avionics systems replace mechanical and electro-mechanical instrument gauges with one or more electronic displays for displaying (e.g., presenting) primary flight information such as attitude, altitude, heading, vertical speed, and so forth, to the pilot. Integrated avionics systems may include one or more primary flight displays (PFD) and one or more multifunction displays (MFD). A representative PFD displays primary flight and selected navigation information that is typically received from one or more sensor systems such as an attitude heading reference system (AHRS), an inertial navigation system (INS), one or more air data computers (ADC) and/or navigation sensors. A representative MFD displays information for navigation and for broad situational awareness such as navigation routes, flight plans, information about aids to navigation (including airports), moving maps, weather information, terrain and obstacle information, traffic information, engine and other aircraft systems information, and so forth.

SUMMARY

An integrated avionics system is described that includes components that provide multi-product functionality. In implementations, the integrated avionics system includes one or more avionics control and display units (CDU). At least one of the CDUs may include a display unit having a touch screen configured to receive touch input. The CDU is configured to have a first mode of operation or a second mode of operation. When the first mode of operation is selected, the display unit is configured to display control indicia to facilitate the control of one or more functions associated with the avionics system. When the second mode of operation is selected, the CDU display unit is configured to enable a cursor control area to facilitate manipulation of indicia displayed by a display device such as a primary flight display (PFD), a multifunction display (MFD), and so forth, via touch input to the touch screen over the cursor control area.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items.

Figure 1A:
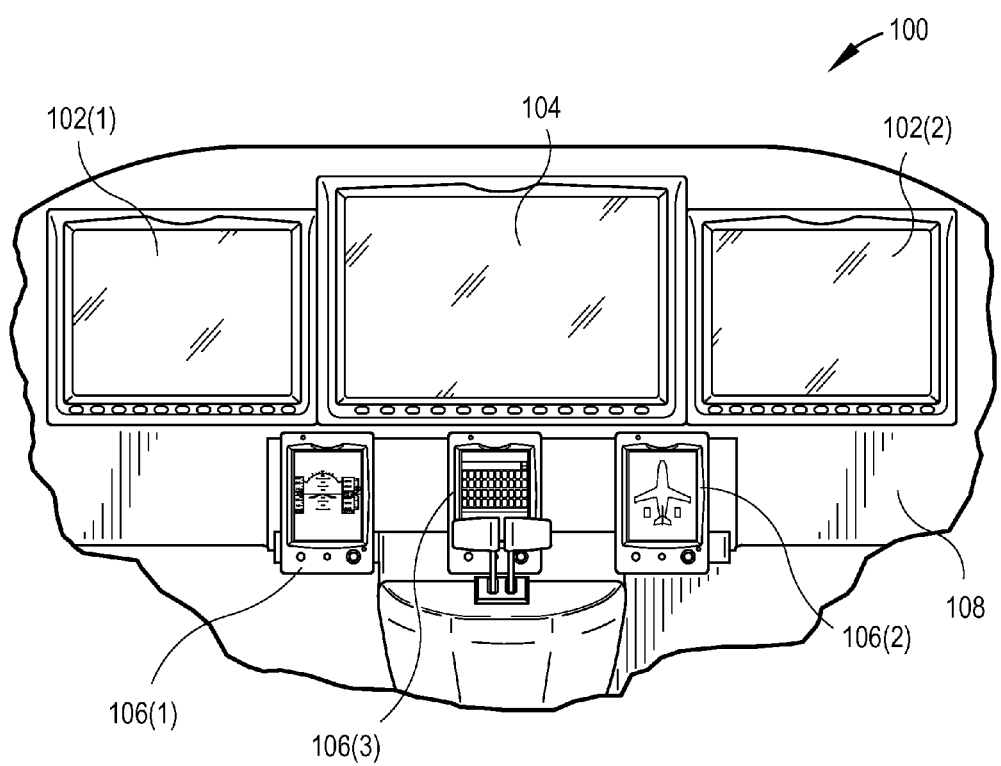
FIG. 1A is an illustration depicting a representative example instrument panel of an aircraft including an integrated avionics system configured in accordance with various implementations of the present disclosure.

The drawing figures do not limit the system to the specific implementations disclosed and described herein. The drawings are not necessarily to scale, emphasis instead being placed upon clearly illustrating elements of the system.

DETAILED DESCRIPTION

Overview

Integrated avionics systems typically employ primary flight display(s) (PFDs) and multifunction display(s) (MFDs) to provide primary flight control, navigational, and other information to the flight crew (e.g., the pilot and/or the co-pilot) of an aircraft. In many instances, a member of the flight crew may wish to interface with one or more aspects of the information conveyed through the display devices to manipulate the information. For example, a pilot may wish to manipulate (e.g., pan, enlarge, or reduce) a map display, or select waypoints on the map display. In large commercial aircraft, the flight crew may interface with displayed information via manipulation of a cursor displayed over (e.g., presented within) the information using a dedicated cursor control device such as a dedicated touch pad, trackball, joystick, or the like. However, in smaller aircraft such as general aviation aircraft and light commercial aircraft, the aircraft's instrument panel may lack sufficient space for dedicated cursor control devices.

Accordingly, an avionics control and display unit (CDU) is described that can be introduced into an integrated avionics system of an aircraft to, amongst other functionality, provide a cursor control mode of operation. In this manner, the CDU may be used as a cursor control device for other display devices within the integrated avionics system. During the cursor control mode of operation, the CDU may be configured to enable a cursor control area to facilitate manipulation of indicia displayed by a display device such as a primary flight display (PFD), a multifunction display (MFD), and so forth, via touch input. In some embodiments, the PFD and/or MFD may include touch screens to receive touch inputs.

In implementations, an integrated avionics system may be provided with one or more avionics control and display units (CDU). Each CDU includes a display unit having a touch screen configured to receive touch input. The CDU further includes a memory operable to store one or more modules and a processor coupled to the display unit and the memory. The CDU processor is configured to execute the one or more modules to select one of a first (e.g., "standard") mode of operation or a second (e.g., "cursor control") mode of operation in response to a received input from an operator such as a member of the aircraft's flight crew (e.g., a pilot or copilot), a maintenance technician, and so forth. When the first mode of operation is selected, the CDU processor further executes the one or more modules to cause the CDU display unit to be configured to display control indicia for facilitating control of one or more functions associated with the avionics system. When, the second mode of operation is selected, the CDU processor further executes the one or more modules to cause the CDU display unit to be configured to enable a cursor control area to facilitate manipulation of indicia displayed by a display device of the avionics system via touch input to the touch screen over the cursor control area.

As noted, the display device may be a primary flight display (PFD) or a multifunction display (MFD). Thus, when the second mode of operation is selected, the CDU may be configured to enable a cursor control area that may be used by the operator to manipulate indicia such as a cursor, displayed information, maps, aircraft control display, and so forth, that are displayed by either the PFD or the MFD (or both) via touch input to the touch screen of the CDU display unit. For example, an operator may apply or provide a touch input to the CDU touch screen within the cursor control area to cause manipulation of a cursor, information, or indicia displayed within the display of either the PFD or the MFD (or both). Specifically, the cursor of the PFD or MFD may be moved from the cursor control area of the CDU touch screen as if a cursor control mechanism (e.g., mouse, joystick, touch input, etc) was applied directly to the PFD or MFD. Similarly, information and indicia displayed on the PFD or MFD may be selected (e.g., clicked) from the cursor control area of the CDU touch screen. In another example, the operator may provide multiple touch inputs (e.g., pan, pinch scale, flick scrolling, rotate, and so forth) to facilitate manipulation of a map (e.g., re-scaling the map, rotating the map, changing the area of the map displayed, and so forth) displayed by the PFD or the MFD (or both). Similarly, information and indicia displayed on the PFD or MFD that may be manipulated by from the CDU touch screen may include documents, charts, images, graphics, and other content commonly displayed by an avionics system. In some implementations, a function (e.g., action) may be performed on information and indicia displayed on the PFD or MFD from the cursor control area of the CDU touch screen.

Example Implementations

Figure 1B:
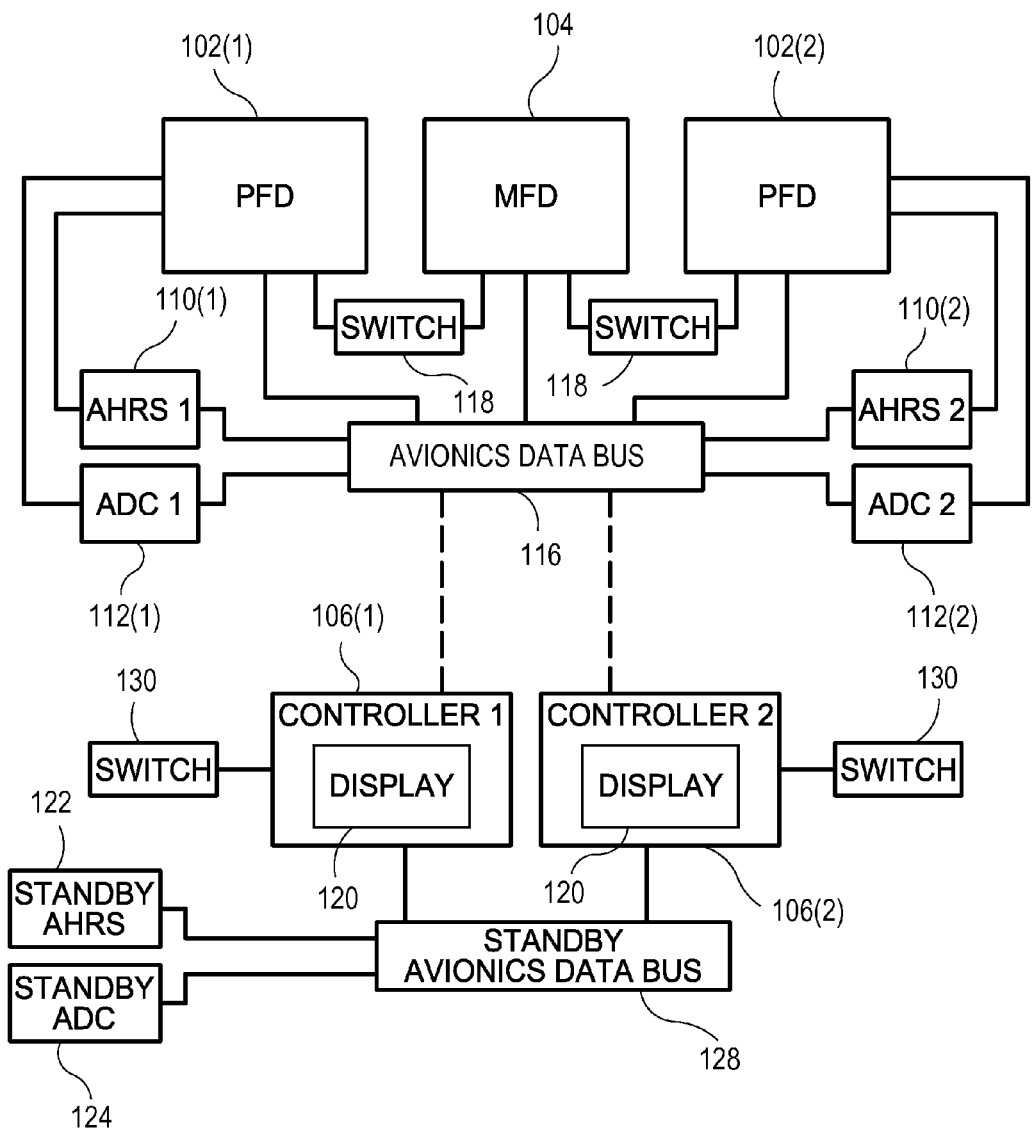
FIG. 1B is first block diagram depicting an implementation of the example integrated avionics system shown in FIG. 1A.

FIGS. 1A and 1B illustrate an example implementation of an integrated avionics system 100 within an aircraft. The integrated avionics system 100 may include one or more primary flight displays (PFDs) 102, one or more multifunction displays (MFD) 104, and one or more multi-product avionics control and display units (CDU) 106. For instance, in the implementation illustrated in FIG. 1A, the integrated avionics system 100 may be configured for use in an aircraft that is flown by two pilots (e.g., a pilot and a copilot). In this implementation, the integrated avionics system 100 may include a first PFD 102(1), a second PFD 102(2), an MFD 104, a first CDU 106(1), a second CDU 106(2), and a third CDU 106(3) that are mounted in the aircraft's instrument panel 108. As shown, the MFD 104 is mounted generally in the center of the instrument panel 108 so that it may be accessed by either pilot (e.g., by either the pilot or the copilot). The first PFD 102(1) and the first CDU 106(1) are mounted in the instrument panel 108 generally to the left of the MFD 104 for viewing and access by the pilot. Similarly, the second PFD 102(2) and the second CDU 106(2) are mounted in the instrument panel 108 generally to the right of the MFD 104 for viewing and access by the aircraft's copilot or other crew member or passenger. The third CDU 106(3) may be mounted between the first and second CDUs 106(1), 106(2). In implementations, the CDUs 106 may be positioned within the instrument panel 108 so that they may be readily viewed and/or accessed by the pilot flying the aircraft (which could be either the pilot or copilot).

The PFDs 102 may be configured to display primary flight information, such as aircraft attitude, altitude, heading, vertical speed, and so forth. In implementations, the PFDs 102 may display primary flight information via a graphical representation of basic flight instruments such as an attitude indicator, an airspeed indicator, an altimeter, a heading indicator, a course deviation indicator, and so forth. The PFDs 102 may also display other information providing situational awareness to the pilot such as terrain information, ground proximity warning information, and so forth.

As shown in FIG. 1B, primary flight information may be generated by one or more flight sensor data sources including, for example, one or more attitude, heading, angular rate, and/or acceleration information sources such as attitude and heading reference systems (AHRS) 110, one or more air data information sources such as air data computers (ADCs) 112, and/or one or more angle of attack information sources. For instance, the AHRSs 110 may be configured to provide information such as attitude, rate of turn, slip and skid; while the ADCs 112 may be configured to provide information including airspeed, altitude, vertical speed, and outside air temperature. Other configurations are possible.

Integrated avionics units (IAUs) may aggregate the primary flight information from the AHRS 110 and ADC 112 and provide the information to the PFDs 102 via an avionics data bus 116. The IAUs may also function as a combined communications and navigation radio. For example, the IAUs may include a two-way VHF communications transceiver, a VHF navigation receiver with glide slope, a global positioning system (GPS) receiver, and so forth. As shown, each integrated avionics unit may be paired with a primary flight display (PFD), which may function as a controlling unit for the integrated avionic unit. In implementations, the avionics data bus 116 may comprise a high speed data bus (HSDB), such as data bus complying with ARINC 429 data bus standard promulgated by the Airlines Electronic Engineering Committee (AEEC), a MIL-STD-1553 compliant data bus, and so forth. In some embodiments, the CDUs 106 may connect to the avionics data bus 116 after being mounted in the aircraft's instrument panel 108.

The MFD 104 displays information describing operation of the aircraft such as navigation routes, moving maps, engine gauges, weather radar, ground proximity warning system (GPWS) warnings, traffic collision avoidance system (TCAS) warnings, airport information, and so forth, that are received from a variety of aircraft systems via the avionics data bus 116.

In implementations, the integrated avionics system 100 employs redundant sources of primary flight information to assure the availability of the information to the pilot, and to allow for cross-checking of the sources of the information. For example, the integrated avionics system 100 illustrated in FIGS. 1 and 2 employs two PFDs 102 that receive primary flight information from redundant AHRSs 110 and ADCs 112 via redundant IAUs. The integrated avionics system 100 is configured so that the first PFD 102(1) receives a first set of primary flight information aggregated by a first IAU from a first AHRS 110(1) and ADC 112(1). Similarly, the second PFD 102(2) receives a second set of primary flight information aggregated by a second IAU from a second AHRS 110(2) and ADC 112(2). Additionally, although a single avionics data bus 116 is illustrated in FIG. 1B, it is contemplated that redundant data buses may be employed for communication between the various components of the integrated avionics system 100.

In implementations, primary flight information provided by either the first AHRS 110(1) and ADC 112(1) or the second AHRS 110(2) and ADC 112(2) may be displayed on either PFD 102(1) or 102(2), or on the MFD 104 upon determining that the primary flight information received from either AHRS 110 and ADC 112 is in error or unavailable. Reversionary switches 118 may be selected by the pilot to configure the PFDs 102 or MFD 104 to display primary flight information from either the first AHRS 110(1) and ADC 112(1) or the second AHRS 110(2) and ADC(2). One or both of the PFDs 102 may also be configured to display information shown on the MFD 104 (e.g., engine gauges and navigational information), such as in the event of a failure of the MFD 104.

The integrated avionics system 100 may employ cross-checking of the primary flight information (e.g., attitude information, altitude information, etc.) to determine if the primary flight information to be provided to either of the PFDs 102 is incorrect. In implementations, cross-checking may be accomplished through software-based automatic continual comparison of the primary flight information provided by the AHRS 110 and ADC 112. In this manner, a "miss-compare" condition can be explicitly and proactively annunciated to warn the pilot when attitude information displayed by either PFD 102 sufficiently disagrees.

The CDUs 106 may provide a general purpose pilot interface to control the aircraft's avionics. For example, the CDUs 106 allow the pilots to control various systems of the aircraft such as the aircraft's autopilot system, navigation systems, communication systems, engines, and so on, via the avionics data bus 116. In implementations, the CDUs 106 may also be used for control of the integrated avionics system 100 including operation of the PFD 102 and MFD 104. In implementations, one or both of the CDUs 106 may include a display unit 120. The display unit 120 of the CDU 106 may be used for the display of information suitable for use by the pilot of the aircraft to control a variety of aircraft systems. Further, as discussed in greater detail herein below, the display unit 120 of the CDU may be configured to enable a cursor control area to facilitate manipulation of indicia displayed by a display device of the avionics system (e.g., a PFD 102 or MFD 104) via touch input to the touch screen over the cursor control area.

The CDUs 106 may be operable to provide independent standby primary flight information to the pilot. The CDUs 106 may be configurable to operate in a reversionary mode to provide standby primary flight information to the pilot(s) of the aircraft. When operating in reversionary mode, the display unit 120 of the CDU 106 is used to display standby primary flight information. As shown in FIG. 1B, standby primary flight information, which may include information such as attitude, altitude, heading, vertical speed, and so forth, may be generated by a standby attitude and heading reference system (AHRS) 122 and a standby air data computer (ADC) 124. Data generated by AHRS 122 and ADC 124 may be provided to one or more of the CDUs 106 via a standby avionics data bus 128. In implementations, one or more mode switches 130 may be selected by the pilot to cause any number of the CDUs 106 to operate in the first mode to display standby primary flight information. While operating in the reversionary mode, the CDUs 106 may be disconnected from the avionics data bus 116 so that the CDUs 106 operate independently of and communicatively isolated from the primary components of the integrated avionics system 100 (e.g., the PFDs 102, the MFD 104, the AHRS 110, the ADCs 112, and so forth). For example, the CDUs 106 may not communicate with the avionics data bus 116 while in the first mode or may be physically disconnected from the avionics data bus 116 (e.g., via the mode switch 130, and so on).

Figure 2:
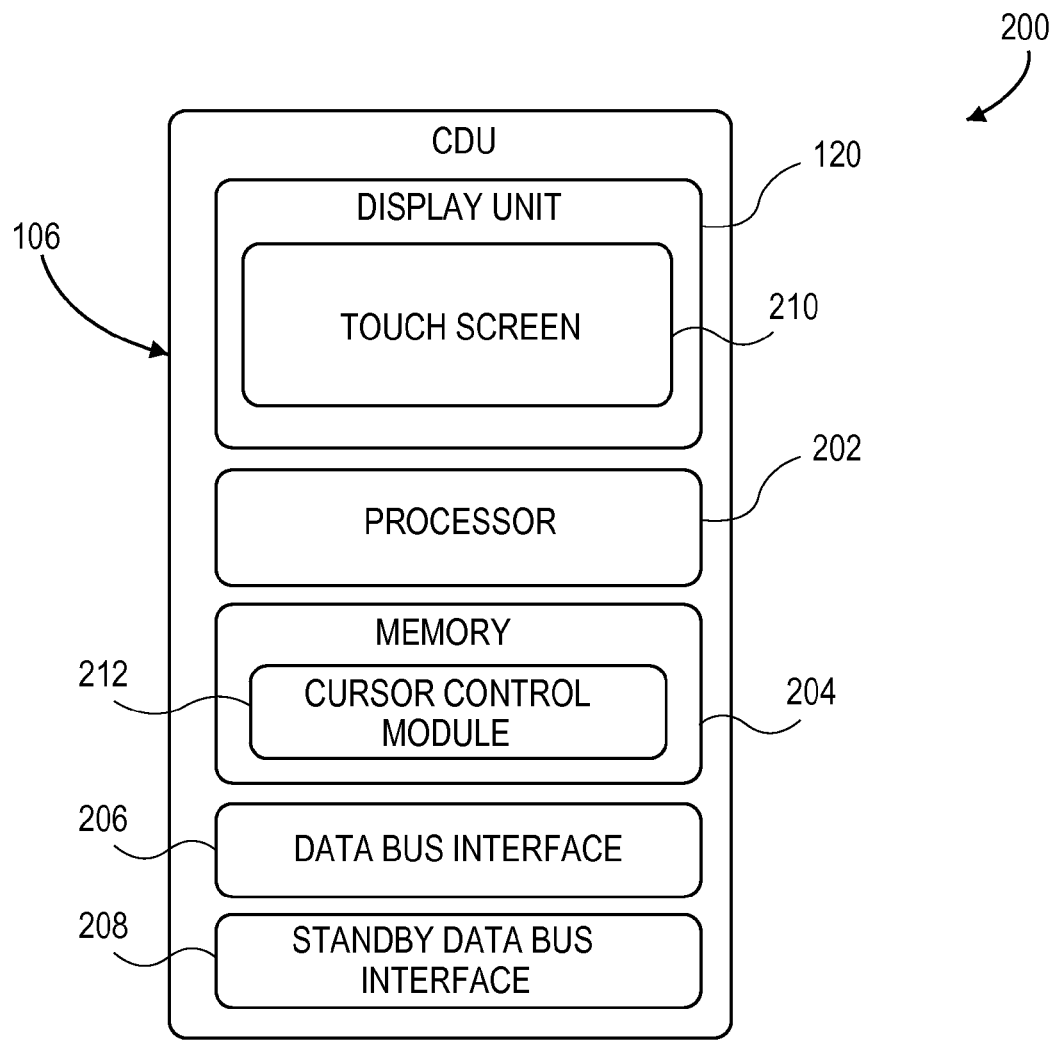
FIG. 2 is a block diagram depicting an example multi-product avionics control and display unit (CDU) suitable for use by the integrated avionics system shown in FIGS. 1A through 1B.

FIG. 2 illustrates a system 200 in an example implementation showing a representative CDU 106 of FIGS. 1A and 1B in greater detail. The CDU 106 is illustrated as including a processor 202; a memory 204; one or more avionics data bus interfaces 206 & 208 and the display unit 120.

The processor 202 provides processing functionality for the CDU 106 and may include any number of processors, micro-controllers, or other processing systems and resident or external memory for storing data and other information accessed or generated by the CDU 106. The processor 202 may execute one or more software programs which implement techniques described herein. The processor 202 is not limited by the materials from which it is formed or the processing mechanisms employed therein, and as such, may be implemented via semiconductor(s) and/or transistors (e.g., electronic integrated circuits (ICs)), and so forth.

The memory 204 is an example of computer-readable media that provides storage functionality to store various data associated with the operation of the CDU 106, such as the software programs and code segments mentioned above, or other data to instruct the processor 202 and other elements of the CDU 106 to perform the functionality described herein. Although a single memory 204 is shown, a wide variety of types and combinations of memory may be employed. The memory 204 may be integral with the processor 202, stand-alone memory, or a combination of both. The memory 204 may include, for example, removable and non-removable memory elements such as RAM, ROM, Flash (e.g., SD Card, mini-SD card, micro-SD Card), magnetic, optical, USB memory devices, and so forth.

The avionics data bus interface 206 and the standby avionics data bus interface 208 provide functionality to enable the CDU 106 to communicate with one or more avionics data buses such as the avionics data bus 116 and standby avionics data bus 128, respectively, illustrated in FIG. 1B. In various implementations, the avionics data bus interface 206 and standby avionics data bus interface 208 may include a variety of components, such as processors, memory, encoders, decoders, and so forth, and any associated software employed by these components (e.g., drivers, configuration software, etc.).

The display unit 120 displays information to the pilot of the aircraft. In implementations, the display unit 120 may comprise an LCD (Liquid Crystal Diode) display, a TFT (Thin Film Transistor) LCD display, an LEP (Light Emitting Polymer or PLED (Polymer Light Emitting Diode) display, a cathode ray tube (CRT), and so forth, capable of displaying text and graphical information. The display unit 120 may be backlit via a backlight such that it may be viewed in the dark or other low-light environments.

The display unit 120 may include a touch interface, such as a touch screen 210, that can detect a touch input within a specified area of the display unit 120 for entry of information and commands. In implementations, the touch screen 210 may employ a variety of technologies for detecting touch inputs. For example, the touch screen 210 may employ infrared optical imaging technologies, resistive technologies, capacitive technologies, surface acoustic wave technologies, and so forth. In implementations, buttons, keypads, knobs and so forth, may be used for entry of data and commands instead of or in addition to the touch screen 210.

The CDU 106 is illustrated as including a cursor control module 212 which is storable in memory 204 and executable by the processor 202. The cursor control module 212 is representative of mode of operation selection and cursor control functionality for the CDU 106. Thus, the cursor control module 212 may provide functionality to select one of a first (e.g., "standard") mode of operation or a second (e.g., "cursor control") mode of operation of the CDU 106 in response to a received input from an operator such as a member of the aircraft's flight crew (e.g., a pilot or copilot), a maintenance technician, and so forth. When the first mode of operation is selected, the cursor control module 212 may further cause the display unit 120 to be configured to display control indicia for facilitating control of one or more functions associated with the integrated avionics system 100 (FIGS. 1A and 1B). Conversely, when the second mode of operation is selected, the cursor control module 212 may cause the display unit 120 to be configured to enable a cursor control area to facilitate manipulation of indicia displayed by a display device (e.g., PFD 102 or MFD 104) of the integrated avionics system 100 via touch input to the touch screen 210 over the cursor control area.

Figure 3:
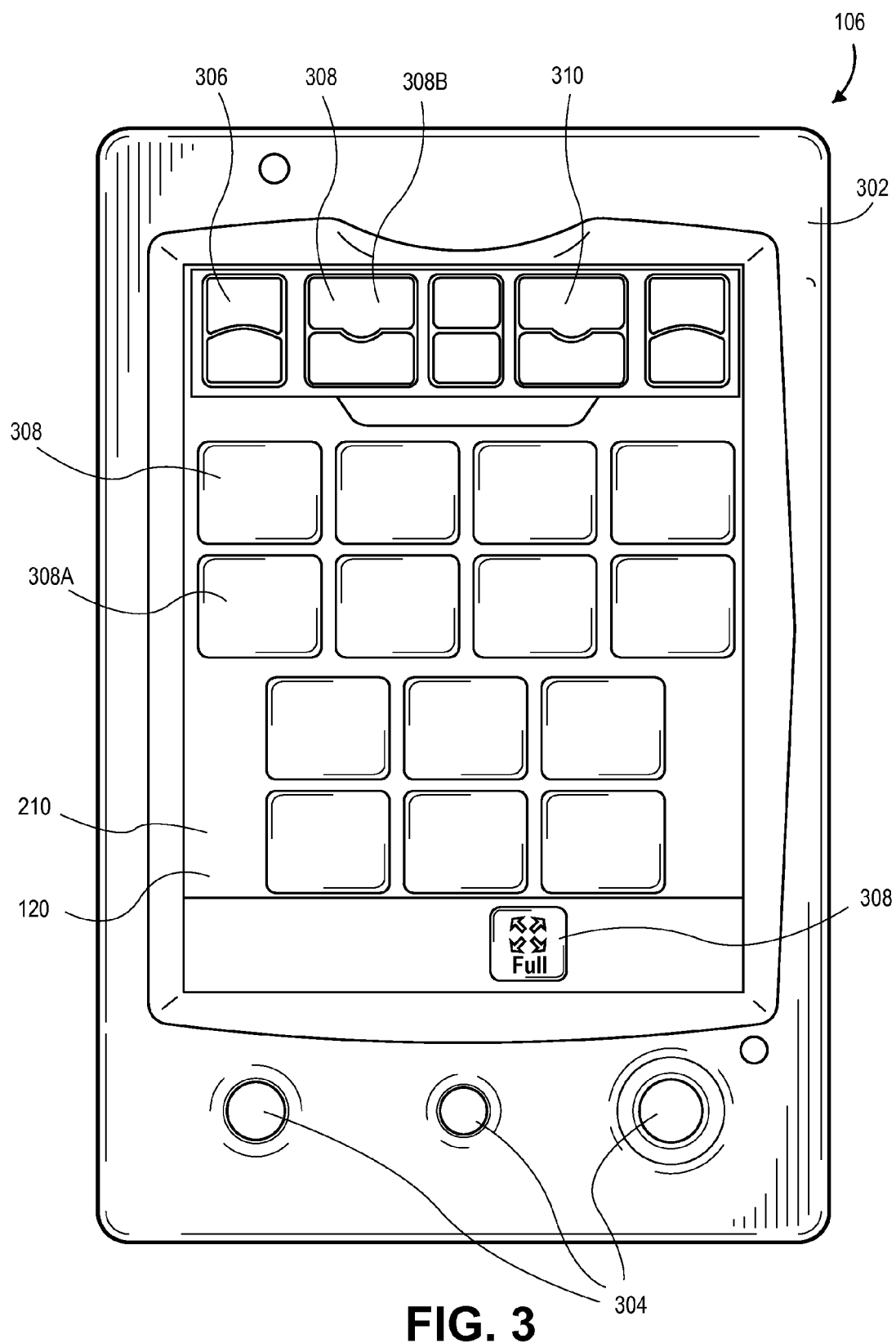
FIG. 3 is an elevation view depicting the multi-product CDU shown in FIG. 2, wherein the display unit is configured to display control indicia to facilitate the control of one or more functions associated with the avionics system.
Figure 4A:
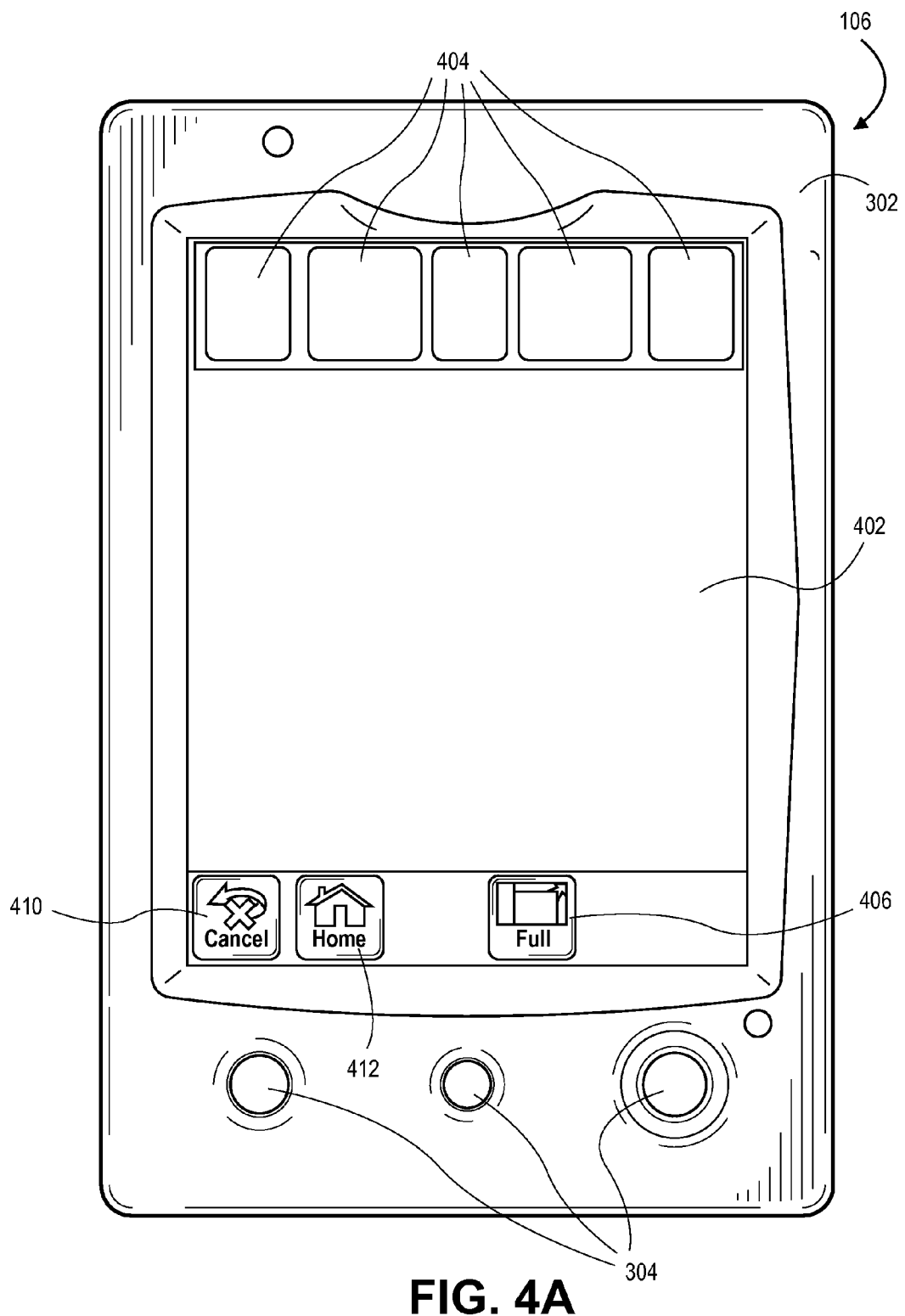
FIGS. 4A and 4B are elevation views depicting the multi-product CDU shown in FIG. 2, wherein the display unit is configured to enable a cursor control area to facilitate manipulation of indicia displayed by a display device such as a primary flight display (PFD), a multifunction display (MFD), and so forth, via touch input to the touch screen over the cursor control area.
Figure 4B:
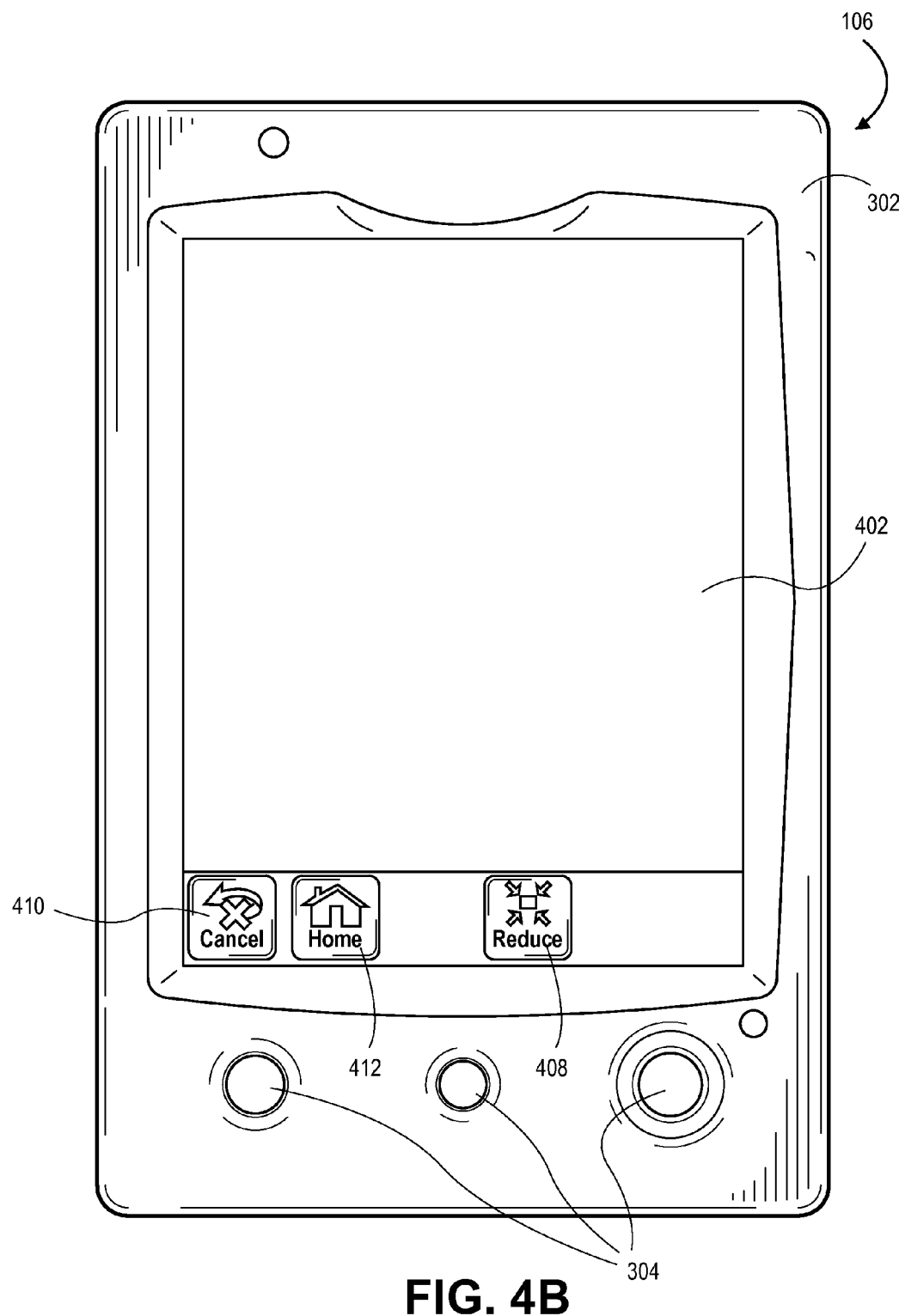

FIGS. 3 through 4B illustrate an example CDU 106 configured for operation in a first (e.g., "standard") mode (FIG. 3) and a second (e.g., "cursor control") mode (FIGS. 4A and 4B), respectively. In the implementation illustrated, the CDU 106 includes a bezel 302 that surrounds the display unit 120 and touch screen 210 to aesthetically integrate the CDU 106 with the instrument panel 108 (shown in FIG. 1A). One or more controls 304 may be provided in the bezel 302 adjacent to the display unit 120 and touch screen 210. In an implementation, the controls 304 may be control knobs, joysticks, buttons, indicia displayed within the display unit 120, combinations thereof, and so forth. An operator may actuate a control 304 to initiate functionality associated with a cursor control module 212 (see FIG. 2). The actuation of the control 304 causes an input to be provided to the processor 202. In response, the processor 202 accesses the cursor control module 212, which causes the processor 202 to select (e.g., toggle) between a first mode of operation and a second mode of operation, as described in greater detail below.

As shown in FIG. 3, the display unit 120 may be operable to display a graphical user interface (GUI) 306 when the CDU 106 is operating in the first mode of operation (e.g., the first mode of operation is selected). In an implementation, the GUI 306 includes indicia 308 such as menus, icons, buttons, windows, text information, and/or other elements, which may be selected by the operator via the touch screen 210 to provide input to the CDU 106 and/or control various functionalities associated with the integrated avionics system 100. Indicia 308 includes control indicia 308A that represents an interface to one or more applications of the integrated avionics system 100 that perform specific functions related to the control and operation of the aircraft. When the operator initiates an application (e.g., the operator touches the touch screen 210 corresponding to the graphical indicia 308A), the application causes specific functionality to occur including, but not limited to: selecting radio frequencies for communication with other entities such as air traffic control, other aircraft, and so forth, causing a graphical representation of flight path to be displayed at the MFD 104; causing air traffic information to be displayed at the MFD 104; causing weather forecasts and/or reports to be displayed at the MFD 104; causing a flight plan to be displayed at the MFD 104; causing waypoint information to be displayed at the MFD 104; causing aircraft system information to be displayed at the MFD 104; selection of entertainment media, and so forth. The above application functionality is described for example purposes only, and it is understood that the integrated avionics system 100 may incorporate additional applications configured to provide additional functionality depending upon the features of the integrated avionics system 100 and aircraft. The GUI 306 may also display text fields 310 (e.g., as part of indicia 308B) for providing a variety of data to the operator. For instance, the GUI 306 may include text fields 310 that provide setting information including, but not limited to: radio frequency settings, autopilot settings, navigational settings and so forth. In implementations, one or more of the settings may be adjusted by inputs from the operator via the touch screen 210 and/or the controls 304. In another implementation, indicia 308A may represent an interface to cause selection (e.g., via execution of the cursor control module 212) of the first mode of operation or the second mode of operation of the CDU 106. For example, an operator may provide a touch input over the touch screen 210 to select indicia 308A to cause a mode selection input to be provided to the processor 202 as discussed herein. In response to input, the processor 202 accesses and executes the cursor control module 212 to cause selection of either the first mode of operation or the second mode of operation of the CDU 106.

Figure 5A:
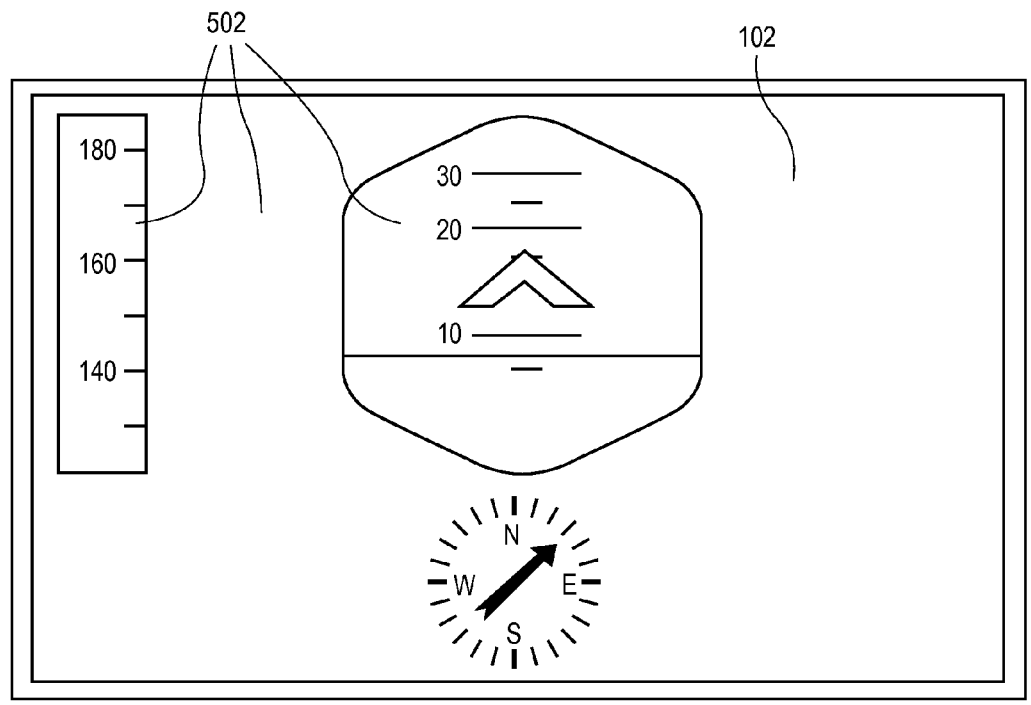
FIG. 5A is a partial elevation view depicting a primary flight display (PFD) shown in FIG. 1, wherein the primary flight display is configured to display primary flight information indicia in accordance with the present disclosure.
Figure 5B:
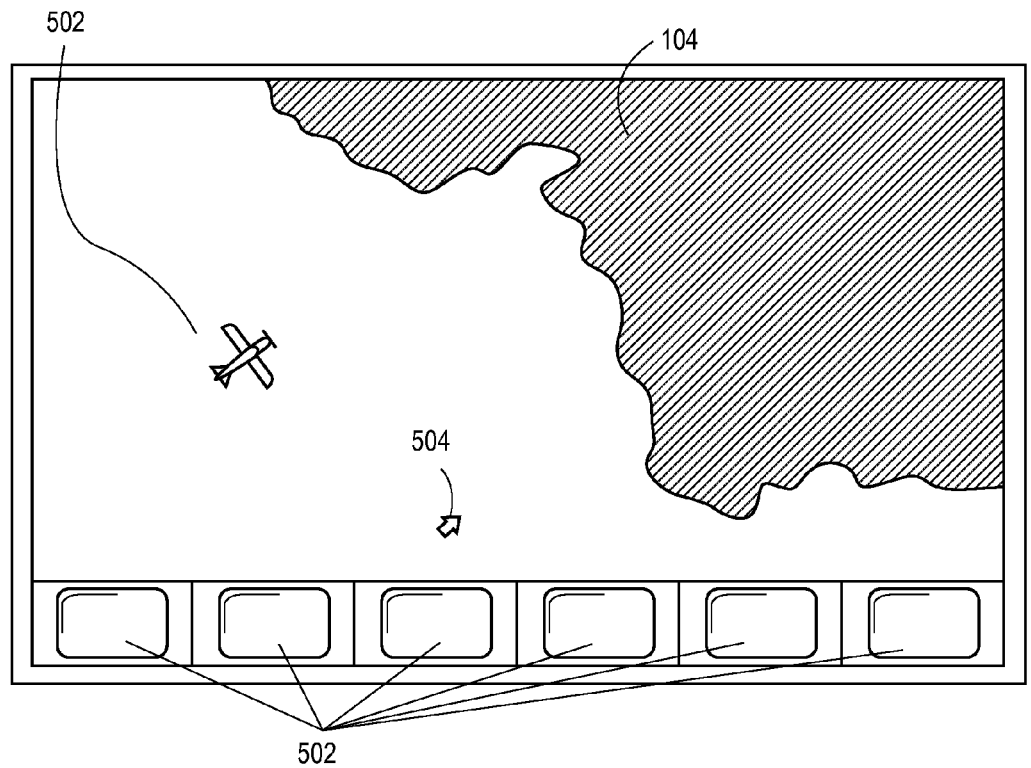
FIG. 5B is a partial elevation view depicting a multifunction display (MFD) shown in FIG. 1, wherein the multifunction display is configured to display operational aircraft information indicia in accordance with the present disclosure.
Figure 5C:
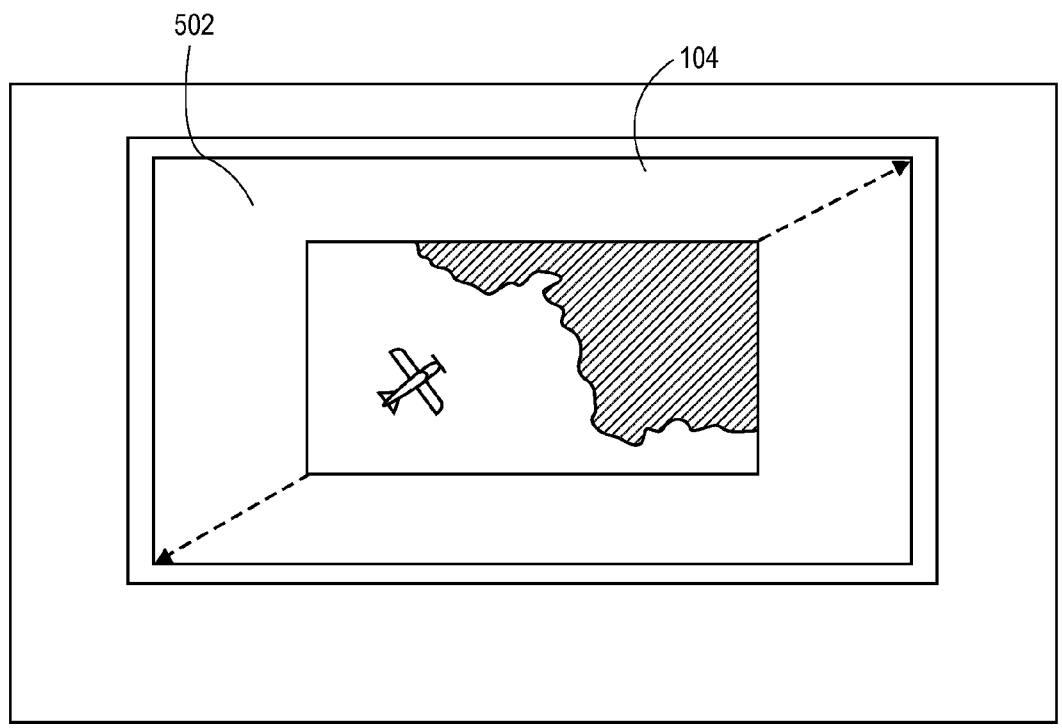
FIG. 5C is partial elevation view depicting the multifunction display shown in FIG. 5B and the multi-product CDU shown in FIG. 4B, wherein touch input is applied to the touchscreen of the display unit to facilitate manipulation of a map indicia displayed by the multifunction display.
Figure 5C:
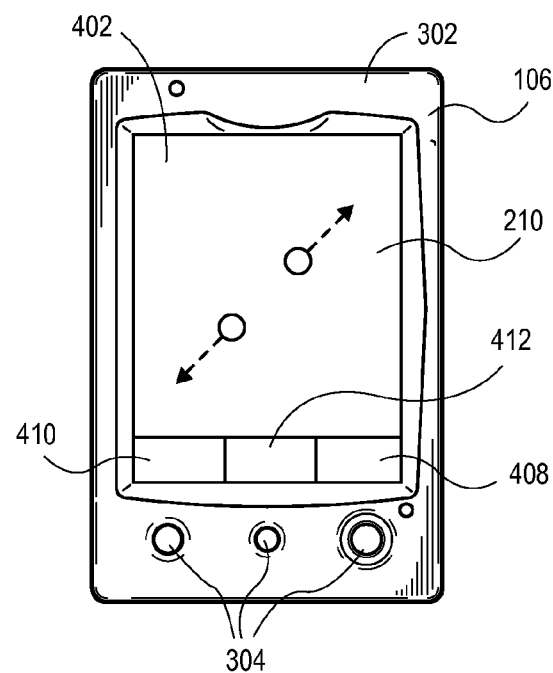

As shown in FIGS. 4A and 4B, the display unit 120 is operable to enable a cursor control area 402 when the CDU 106 is in the second mode of operation. In the second mode of operation, the cursor control area 402 provides an interface to facilitate manipulation of indicia 502 displayed by PFDs 102 or MFDs 104 (see FIGS. 5A through 5D). As shown in FIG. 5A, PFDs 102 may display indicia 502 that represents primary flight information (e.g., aircraft attitude, altitude, heading, vertical speed, and so forth). As shown in FIG. 5B, the MFD 104 displays indicia 502 that represents information describing operation of the aircraft (e.g., navigation routes, moving maps, engine gauges, weather radar, ground proximity warning system (GPWS) warnings, traffic collision avoidance system (TCAS) warnings, airport information, and so forth). An operator can manipulate indicia 502 by providing touch input to the touch screen 210 within the cursor control area 402. The indicia 502 may be manipulated in various manners corresponding to the provided touch input. In an implementation, an operator may provide a single finger touch input, a multi-touch input, and so forth, to the touch screen 210 to manipulate indicia 502 displayed by PFDs 102 or MFDs 104. For example, the MFD 104 may display a map of an area surrounding the aircraft. The operator may perform a pan operation to modify the displayed map region (e.g., display a map region corresponding to the user's pan input). For instance, the operator may perform a one finger pan to view a region of the map outside of the currently displayed map area. The one finger pan may correspond to an operator placing his or her finger over the touch screen 210 and moving his or her finger within the cursor control area 402 corresponding to an area of the map the operator wishes to view. In another example, the operator may perform a two finger pinch scale input over the touch screen 210 to re-scale (e.g., control the scaling of) the map displayed within the MFD 104. For instance, as shown in FIG. 5C, the operator may perform a pinch scale input to re-scale the map region corresponding to the operator's input in the second mode of operation (e.g., "zoom-in" to re-scale the displayed map to have greater granularity with respect to the previously displayed map, "zoom out" to re-scale the displayed map to have less granularity with respect to the previously displayed map, and so forth). The pinch scale input may correspond to a zoom operation where the operator positions two opposing fingers within the cursor control area 402 and moves the fingers away/towards each other corresponding to the desired zoom operation. In yet another example, the operator may perform a double tap "zoom in" input over the touch screen 210 to re-scale the map displayed within the MFD 104 so that map has greater granularity with respect to the previously displayed map.

Figure 5D:
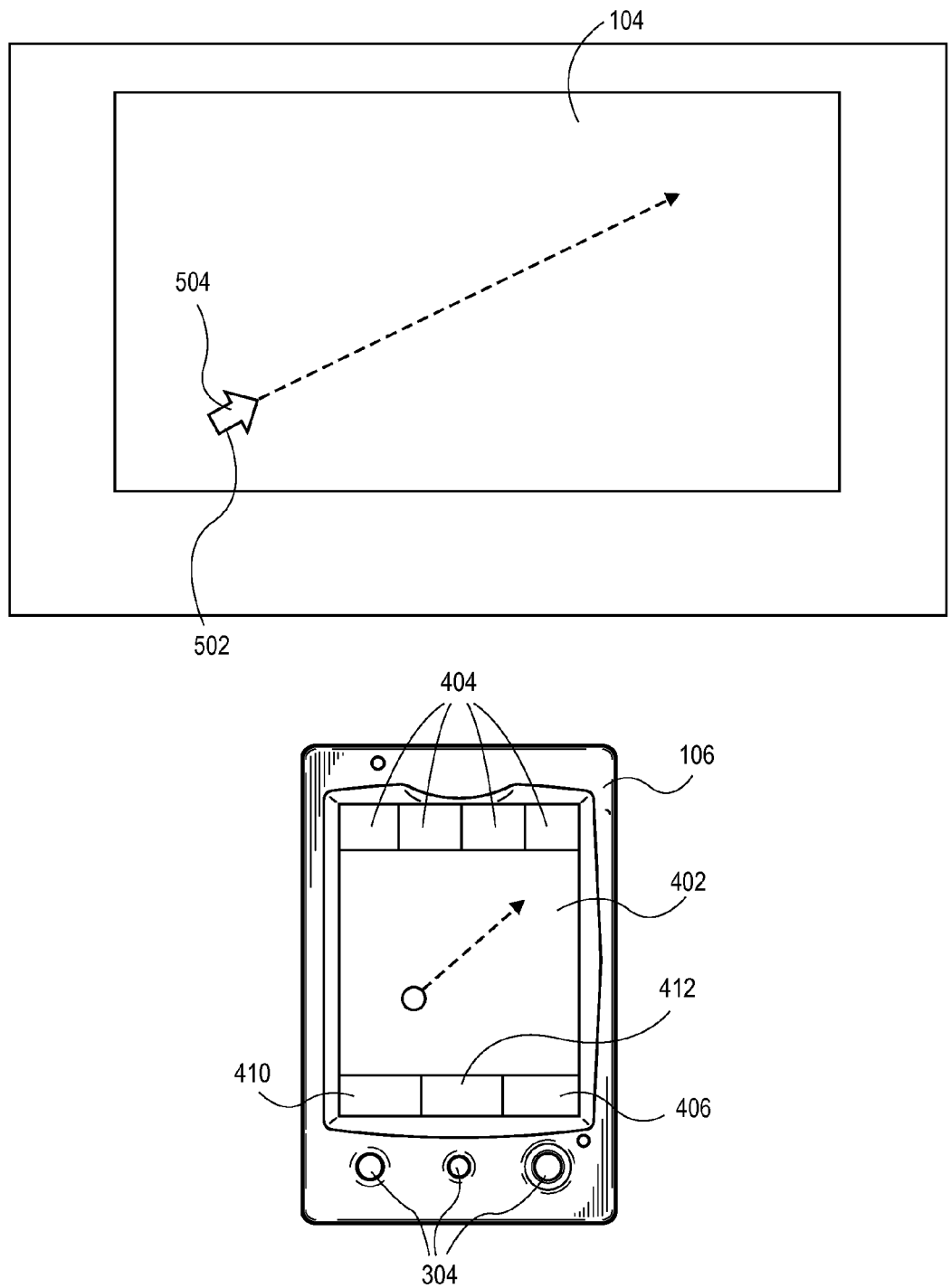
FIG. 5D is partial elevation view depicting the multifunction display (MFD) shown in FIG. 5B and the multi-product CDU shown in FIG. 4A, wherein touch input is applied to the touchscreen of the CDU display unit to facilitate manipulation of a cursor indicia displayed by the multifunction display.

As shown in FIG. 5D, indicia 502 may also include a cursor 504, which can be manipulated by the operator through the touch screen 210 when the CDU 106 is in the second mode of operation. For example, touch input provided to the CDU touch screen 210 within the cursor control area 402 is translated to a relative position within the PFD 102 and/or the MFD 104 to manipulate the cursor 504. In an implementation, the touch input may be invalidated and/or not recognized if the operator provides a touch input to an area outside of the cursor control area 402. Thus, the operator may manipulate the cursor 504 to a desired position within the PFD 102 and/or the MFD 104 by applying a touch input to the CDU touch screen 210. For instance, the operator may manipulate the cursor 504 to actuate an aircraft sub-routine through the PFD 102 and/or the MFD 104. In another instance, the operator may manipulate the cursor 504 to control a scaling feature of a map displayed within the MFD 104. In yet another instance, the operator may manipulate the cursor 504 to a point of interest within a map displayed by the MFD 104.

In some implementations, an indication of or a perimeter around the cursor control area 402 may be displayed within a portion of the CDU display unit 120 (see FIG. 4A). For example, when the operator (e.g., pilot or copilot) actuates a control 304 (e.g., actuates a joystick, depresses a button, and so forth) of the CDU 106, the cursor control area 402 is enabled within a portion of the display unit 120. Thus, the operator may provide or apply a touch input capable of manipulating the indicia 502 within the enabled cursor control area 402. Indicia corresponding to one or more control buttons 404 may also be displayed by the display unit 120. In the example shown, the control buttons 404 are aligned horizontally above (distal from the operator) the cursor control area 402. However, the control buttons 404 may be aligned differently in accordance with the requirements of the integrated avionics system 100. The control buttons 404 represent graphical representations of various applications that perform specific functionality in response to selection of the corresponding control button 404. The functionality may include, but is not limited to: causing the display of waypoint information, allowing the creation of waypoint information defined by a user, causing the display of airspace information, displaying information associated with the operator, and so forth. The above functionality is described for example purposes only and is not meant to be limiting.

In some implementations, the operator may wish to utilize a greater portion of the display unit 120 to provide touch input to. As shown in FIG. 4A, the operator may select indicia (e.g., "Full" Screen button 406) displayed within display unit 120. Full Screen button 406 represents an interface (e.g., the operator can provide a touch input over the Full Screen button 406 to actuate specific functionality related to the Full Screen button 406), that when selected, causes the CDU 106 to convert to a full screen display mode wherein a greater portion of the display unit 120 is occupied by the cursor control area 402 as shown in FIG. 4B. In this manner, the operator is provided with a larger area in which he or she may apply a touch input to manipulate indicia 502 of the display device (e.g., PFD 102 or MFD 104). For example, selection of the Full Screen button 406 may cause the portion of the CDU display unit 120 displaying the control buttons 404 to be removed from the display unit 120 and replaced with a cursor control area 402 having increased area as shown in FIG. 4B. When in the full screen display mode, the display unit 120 may cause indicia (e.g., "Reduce" Screen button 408) to be displayed. The Reduce Screen button 408, when selected, may represent an interface to cause the display unit 120 to reduce the size of the enabled cursor control area 402 and add control buttons 404 to the display unit 120 (e.g., cursor control area 402 is again displayed within a portion of the display unit 120 as shown in FIG. 4A). It is further contemplated that the size of the cursor control area 402 may be determined or selected by the operator (e.g., via a control 304, indicia (e.g., control buttons) displayed by the display unit 120, touch input to the touch screen 210 over the cursor control area 402, combinations thereof, and so forth.

As shown in FIGS. 4A and 4B, the display unit 120 is also configured to display control buttons 404 including a "Cancel" button 410 and a "Home" button 412. The Cancel button 410 is representative of an interface to allow an operator to cause cancellation of the previous input and/or functionality initiated by the input to the display unit 120. For example, if an operator has inadvertently provided an input to cause the cursor control area 402 to increase the size of the enabled cursor control area 402 (e.g., provided touch input over touch screen 210 corresponding to the Full Screen button 406), the operator may provide a touch input over the touch screen 210 corresponding to the Cancel button 410 to return to the previous state (e.g., cursor control area 402 is enabled within a reduced portion of the display unit 120). In another implementation, the operator may utilize the Cancel button 410 to cancel an operation provided to the PFDs 102 or the MFD 104. The Home button 412 is representative of an interface to cause, when actuated, a home screen (e.g., GUI 306 shown in FIG. 3) to be displayed at the display unit 120. In some embodiments, the Home button 412 may be representative of an interface to cause the CDU 106 to convert from the second mode of operation to the first mode of operation. As shown, the control buttons 404 (e.g., Full Screen button 406, Reduce Screen button 408, Cancel button 410, and Home button 412) may be aligned horizontally below (proximate to the operator) the cursor control area 402. However, it is understood that the control buttons 404 may be displayed in other portions of the display unit 120 with respect to the cursor control area 402 in accordance with the requirements of the integrated avionics system 100.

In some implementations, the indicia displayed within display unit 120 (e.g., "Full" Screen button 406, "Reduce" Screen button 408 "Cancel" button 410, and a "Home" button 412) may facilitate manipulation of indicia displayed by a display device (e.g., PFD 102 or MH) 104) of the integrated avionics system 100 via touch input to the touch screen 210 over the cursor control area. For example, the a touch input within CDU display unit 120 selecting (e.g., activating) the "Full" Screen button 406, may cause content displayed on a display device (e.g., PH) 102 or MFD 104) to expand to fill substantially the full screen of the display device.

In some implementations, a function (e.g., action) may be performed on information and indicia displayed on the PFD or MFD from the cursor control area of the CDU touch screen. A graphic, such as an icon, associated with the function (e.g., action) may be displayed within the display unit 120. In an implementation, if a cursor is presented within the display device (e.g., PFD 102 or MFD 104), a touch input associated with the graphic may cause a function to be performed on information or indicia displayed under the cursor of the display device. For example, icons for "More Info," "Direct To," and "Insert in Flight Plan" may be presented within CDU display unit 120 with a cursor control area enabled. Information and indicia, including a cursor, may be displayed by a display device (e.g., PFD 102 or MFD 104). The cursor's position may be manipulated from the cursor control area of CDU display unit 120 to be positioned over information and other indicia displayed by the display device. A touch input associated with the "More Info" icon may cause performance of a more information function on any information or indicia that overlaps with the current cursor position. In some embodiments, an input selecting a control button 404 representing various applications that perform specific functionality in response to selection of the corresponding control button 404 on information or indicia displayed under the cursor of the display device. It is to be understood that any function may be initiated from inputs to the CDU, including display unit 120.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the integrated avionics system 100 of FIGS. 1A and 1B can be wired, wireless, or some combination thereof. In the case of a software implementation, for instance, the module represents executable instructions that perform specified tasks when executed on a processor, such as the CDU processor 202 shown in FIG. 2. The program code can be stored in one or more device-readable storage media, an example of which is the memory 204 associated with the CDU 106 of FIG. 2.

Example Methods

Figure 6:
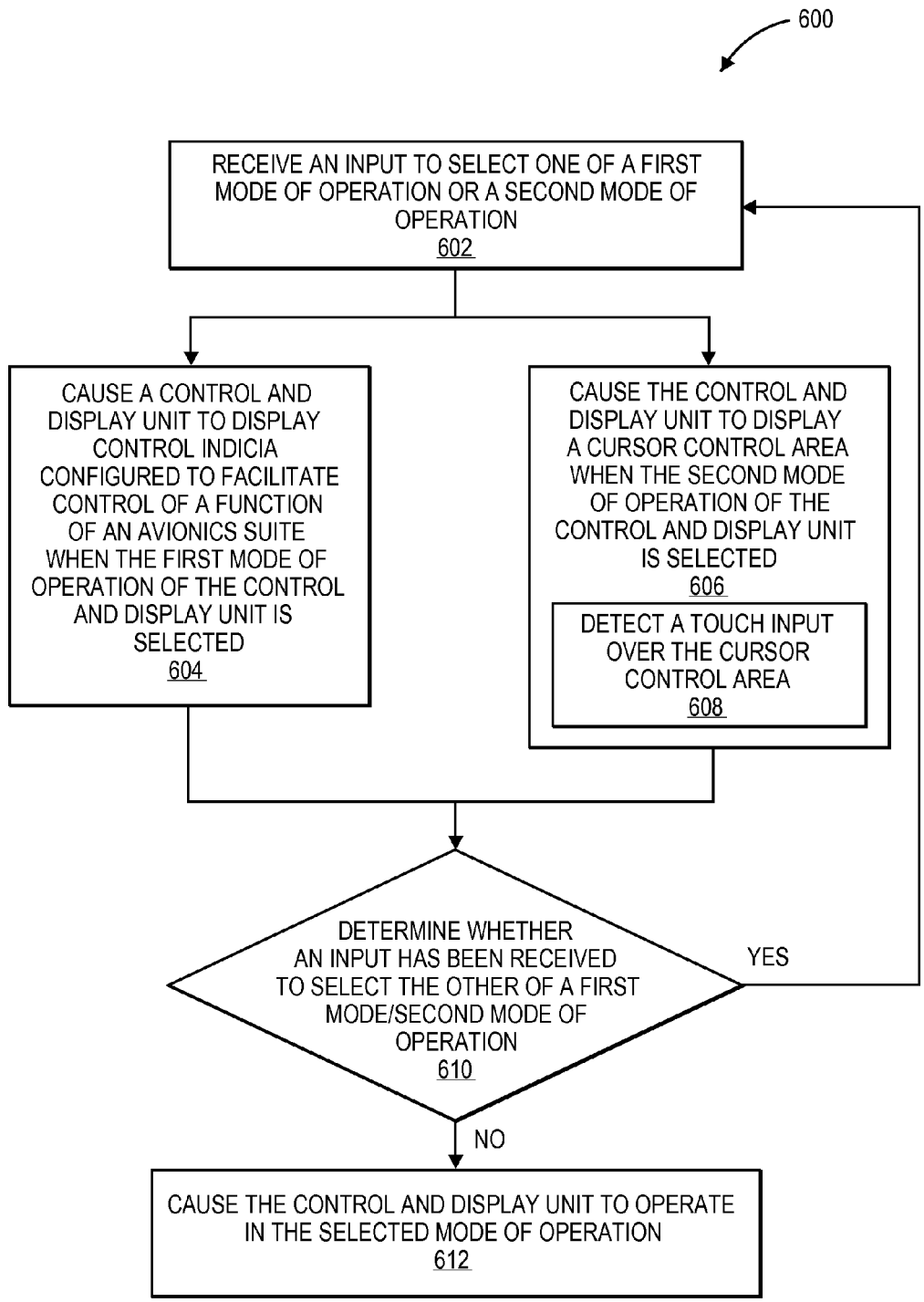
FIG. 6 is a flow diagram depicting a method in an example implementation in which a multi-product CDU, such as the CDU of the present disclosure, is configured to provide a cursor control mode of operation.

FIG. 6 depicts a method 600 in an example implementation in which an avionics control and display unit (CDU) of an avionics system is configured to switch between a first mode of operation and a second mode of operation to apply cursor control functionality to a CDU, such as the CDU 106 illustrated in FIGS. 1 through 4B. As shown in FIG. 6, an avionics control and display unit (CDU) of an avionics system receives an input to select one of a first mode of operation or a second mode of operation (Block 602). As discussed herein with respect to FIGS. 1 through 4B, at some points during operation and/or maintenance of the aircraft, the operator may wish to manipulate indicia 502 displayed by a display device such as a PFD 102 or MFD 104. Thus, the operator may actuate a control 304 of a control and display unit (CDU) 106 of the integrated avionics system 100 (or indicia 308A displayed within the display unit 120 of the CDU 106) to apply an input to the processor 202 to access and execute a cursor control module 212. For example, the input may be a signal representing data or a parameter provided to the processor 202 to cause the processor 202 to access and execute the cursor control module 212. As described above, the cursor control module 212 is representative of functionality to select a first mode of operation or a second mode of operation of the CDU 106. Upon powering the integrated avionics system 100, the CDU 106 may begin in the first mode of operation. Therefore, when the operator actuates control 304, or selects indicia 308A, the cursor control module 212 causes the processor 202 to select the second mode of operation of the CDU 106. In embodiments, the display device may be a primary flight display (PFD) 102 or a multifunction display (MFD) 104.

When the first mode of operation of the control and display unit (CDU) is selected, control indicia configured to facilitate control of a function of the avionics system is displayed by the CDU display unit (Block 604). For example, as shown in FIGS. 1 through 4B, upon selection of the first mode of operation, the processor 202 is configured to cause the display unit 120 to display one or more graphical indicia 308 (e.g., indicia 308A) that are configured to facilitate control functionality of the integrated avionics system 100. The indicia 308A represents interfaces that actuate various sub-routines to cause specific functionality to occur when triggered (e.g., operator provides touch input over the touch screen 210 corresponding to the indicia 308A).

When the second mode of operation of the control and display unit is selected, a cursor control area is enabled by the control and display unit (CDU) (Block 606). As described above, the enabled cursor control area is configured to facilitate manipulation of indicia displayed by a display device of the avionics system via a touch input to the touch screen over the cursor control area. Upon selection of the second mode of operation, the processor 202 is configured to cause the display unit 120 to enable a cursor control area 402. As shown in FIG. 6, the touch screen detects a touch input over the cursor control area that is configured to facilitate manipulation of indicia displayed by the display device (Block 608). Thus, as shown in FIGS. 5C and 5D, the cursor control area 402 is configured to receive a touch input to facilitate manipulation of indicia 502 displayed by a display device (e.g., PFD 102, MFD 104). As described above, a touch input may include, but is not limited to: a single finger touch input, a multi-touch input, and so forth, that correspondingly manipulate the indicia 502. In implementations, the indicia 502 include primary flight information displayed within PFD 102, information describing operation of the aircraft displayed within a MFD 104, a cursor 504, and so forth.

As shown in FIG. 6, the processor determines whether an input (e.g., touch input) has been received to select the other of the first mode/second mode of operation (Decision Block 610). If an input has been received (YES from Decision Block 610), the processor causes the control and display unit (CDU) to switch from either the first or second mode of operation to the other of the first or second mode of operation. If no input has been received (NO from Decision Block 610), the processor continues to cause the control and display unit to operate in the selected mode of operation (Block 612).

Conclusion

Although the integrated avionics system 100 has been described with reference to example implementations illustrated in the attached drawing figures, it is noted that equivalents may be employed and substitutions made herein without departing from the scope of the invention as recited in the claims. Further, the integrated avionics system 100 and its components as illustrated and described herein are merely examples of a system and components that may be used to implement the present invention and may be replaced with other devices and components without departing from the scope of the present invention.

What is claimed is:

1. An avionics control and display unit (CDU) for use in an avionics system, the CDU comprising:
    a display unit having a touch screen configured to detect touch input;
    a memory operable to store one or more modules; and
    a processor coupled with the display unit and the memory, the processor operable to execute the one or more modules to:
    select one of a first mode of operation or a second mode of operation in response to a received input, the first mode of operation causing the display unit to be configured to display a graphical user interface including control indicia for facilitating control of one or more functions associated with the avionics system that relate to the operation of the aircraft, the second mode of operation causing the display unit to be configured to enable a cursor control area to facilitate manipulation of indicia displayed by a display device of the avionics system via touch input to the touch screen over the cursor control area.

2. The CDU of claim 1, wherein the indicia displayed by the display device comprises a cursor presented within a display of the display device, and wherein the touch input to the touch screen causes manipulation of the cursor.

3. The CDU of claim 1, wherein the control indicia include at least one of a radio frequency control for selecting a frequency, a flight path control for displaying flight plan information, a waypoint control for selecting a waypoint, or a weather control for displaying weather information.

4. The CDU of claim 1, wherein the display device comprises at least one of a primary flight display or a multifunction display.

5. The CDU of claim 1, further comprising a control, the control configured to cause the input to be provided to the processor upon actuation of the control.

6. The CDU of claim 1, wherein the indicia displayed by the display device comprises a map displayed by the display device, and wherein the touch input to the touch screen causes manipulation of the map.

7. The CDU of claim 1, wherein the touch input comprises at least one of a single finger input or a multi-touch input.

8. A method comprising:
    receiving an input to an avionics control and display unit (CDU) in an avionics system, the avionics CDU including a display having a touch screen, wherein the input is configured to select one of a first mode of operation or a second mode of operation of the avionics CDU;
    causing the avionics CDU to be configured to display a graphical user interface including control indicia when the first mode of operation of the CDU is selected, the control indicia configured to facilitate control of one or more functions associated with the avionics system that relate to the operation of the aircraft; and
    causing the avionics CDU to be configured to enable a cursor control area when the second mode of operation of the avionics CDU is selected, the cursor control area configured to facilitate manipulation of indicia displayed by a display device of the avionics system via a touch input to the touch screen over the cursor control area.

9. The method as recited in claim 8, the indicia displayed by the display device comprises a cursor presented within a display of the display device, and wherein the touch input to the touch screen causes manipulation of the cursor.

10. The method as recited in claim 8, further comprising: detecting a touch input over the cursor control area via the touch screen.

11. The method as recited in claim 8, wherein the control indicia include at least one of a radio frequency control for selecting a frequency, a flight path control for displaying flight plan information, a waypoint control for selecting a waypoint, or a weather control for displaying weather information.

12. The method as recited in claim 8, wherein the display device comprises at least one of a primary flight display or a multifunction display.

13. The method as recited in claim 8, wherein the avionics control and display unit further comprises a control configured to cause the input to be provided to the processor upon actuation of the control.

14. The method as recited in claim 8, wherein the indicia displayed by the display device comprises a map displayed by the display device, and wherein the touch input to the touch screen causes manipulation of the map.

15. The method as recited in claim 8, wherein the touch input comprises at least one of a single finger input or a multi-touch input.

16. An integrated avionics system for use in an aircraft, the system comprising:
    a primary flight display (PFD) operable to display primary flight information;
    a multifunction display (MFD) operable to display information describing operation of the aircraft; and
    a control and display unit (CDU) including a display unit having a touch screen configured to detect touch input, a memory operable to store one or more modules, and a processor operable to execute the one or more modules to:
    select one of a first mode of operation or a second mode of operation in response to a received input, the first mode of operation causing the display unit to be configured to display a graphical user interface including control indicia for facilitating control of one or more functions associated with the avionics system that relate to the operation of the aircraft, the second mode of operation causing the display unit to be configured to enable a cursor control area to facilitate manipulation of indicia displayed by at least one of the PFD or the MFD via touch input to the touch screen over the cursor control area.

17. The integrated avionics system as recited in claim 16, wherein the indicia displayed by at least one of the PFD or the MFD comprises a cursor presented within a display of the display device, and wherein the touch input to the touch screen causes manipulation of the cursor.

18. The integrated avionics system as recited in claim 16, wherein the control indicia include at least one of a radio frequency control for selecting a frequency, a flight path control for displaying flight plan information, a waypoint control for selecting a waypoint, or a weather control for displaying weather information.

19. The integrated avionics system as recited in claim 16, wherein the CDU further includes a control configured to cause the input to be provided to the processor upon actuation of the control.

20. The integrated avionics system as recited in claim 16, wherein the touch input comprises at least one of a single finger input or a multi-touch input.

\* \* \* \* \*